United States Patent [19]
Hartweg et al.

[11] Patent Number: 5,965,099
[45] Date of Patent: Oct. 12, 1999

[54] CATALYST AND A METHOD FOR ITS PRODUCTION AND USE OF SAME

[75] Inventors: Martin Hartweg, Erbach; Andrea Seibold, Blaustein; Leonhard Walz, Rastatt; Thomas Fetzer, Speyer; Bernd Morsbach, Ludwigshafen, all of Germany

[73] Assignees: Daimler-Benz Aktiengesellschaft, Stuttgart; BASF Aktiengesellschaft, Ludwigshafen, both of Germany

[21] Appl. No.: 09/206,392

[22] Filed: Dec. 7, 1998

Related U.S. Application Data

[62] Division of application No. 08/764,464, Dec. 12, 1996.

[30] Foreign Application Priority Data

Dec. 13, 1995 [DE] Germany .......................... 195 46 481

[51] Int. Cl.⁶ ................. B01J 8/02; B01J 23/00; B01J 23/42; B01D 47/00
[52] U.S. Cl. ............. 423/213.5; 423/212; 502/304; 502/524; 502/303; 502/307; 502/308; 502/309; 502/312; 502/313; 502/325; 502/321; 502/329; 502/317; 502/318; 502/346

[58] Field of Search ...................... 502/304, 524, 502/525, 303, 305, 307, 308, 309, 312, 313, 321, 325, 329, 317, 318, 331, 333–339, 344–346, 349–351; 423/213.5, 212, 239.1

[56] References Cited

U.S. PATENT DOCUMENTS

| | | | |
|---|---|---|---|
| 3,903,020 | 9/1975 | Sergeys et al. | 252/455 R |
| 4,140,655 | 2/1979 | Chabot et al. | 252/462 |
| 5,580,534 | 12/1996 | Hartweg et al. | 423/239.2 |

*Primary Examiner*—Mark L. Bell
*Assistant Examiner*—Patricia L. Hailey
*Attorney, Agent, or Firm*—Evenson, McKeown, Edwards & Lenahan, P.L.L.C.

[57] ABSTRACT

A catalyst and a method for producing the catalyst, for catalytic reduction of $NO_x$ and oxidation of hydrocarbons, the catalyst comprises a zinc, copper and aluminum spinel to which, at least one element selected from palladium, platinum, rhodium, ruthenium, osmium, iridium, rhenium and/or rare earth metals, such as lanthanum and cerium, vanadium, titanium, niobium, molybdenum, tungsten and/or salts thereof and/or oxides thereof has been added.

12 Claims, 5 Drawing Sheets

CATALYST AND A METHOD FOR ITS PRODUCTION AND USE OF SAME

This application is a division of co-pending application Ser. No. 08/764,464, filed Dec. 12, 1996.

BACKGROUND AND SUMMARY OF THE INVENTION

The present invention relates to a catalyst comprising a spinel which comprises copper (Cu), zinc (Zn) and aluminum (Al), to a method for producing the catalyst comprising a spinel which comprises copper (Cu), zinc (Zn) and aluminum (Al), as well as to the use of such a catalyst.

Published German Patent Application No. DE 43 01 470, discloses a $CuAl_2O_4$ spinel wherein tin, lead and an oxide, a salt or an elemental form of an element of the second main or subsidiary group of the Periodic Table has been added, and subsequently calcined to form the final spinel. The spinel is used to decompose laughing gas ($N_2O$). However, this patent does not teach the use of this spinel as a catalyst for the catalytic oxidation of CO to $CO_2$ and/or for the catalytic reduction of NOR, preferably of NO and $NO_2$, especially at temperatures of several hundred degrees centigrade.

According to the present invention, a spinel is understood to be a material having the general chemical formula $A_aB_bO_4$, which has, at least microscopically, a crystallographic or crystalline cubic lattice structure with face-centered oxygen ions and with tetrahedral or octahedral gaps. All the A atoms and up to 50% of the B atoms are disposed in the tetrahedral gaps and the remaining B atoms are disposed in the octahedral gaps. The term A atom or B atom refers here only to the crystallographic arrangement. From a material point of view, the A atoms, as well as the B atoms, can be different from one another.

For environmental reasons, the purification of gases, particularly of exhaust gases, which are produced by internal combustion engines for example, especially, by diesel engines and engines operating on a lean mixture, as well as the decrease in the CO content of exhaust gases and the denitrification of these gases, that is, the decomposition of nitrogen oxides ($NO_x$), is a pressing problem.

Published European Patent Application No. EP 042 471 discloses a catalyst which is used for catalytic oxidation of carbon monoxide (CO) to carbon dioxide ($CO_2$) and contains the metals copper (Cu), zinc (Zn) and aluminum (Al) as metal oxides. At least 60% of the copper present is bound to the aluminum oxide as a copper oxide/aluminum oxide spinel. Zinc oxide is disposed in the free spaces of the porous spinel in a proportion by weight of between 1% to 20%.

However, the catalyst disclosed in EP 042 471 is known only for its purifying action with regard to carbon monoxide, which is based on the catalytic oxidation of the carbon monoxide. Whether the catalyst is also suitable for the purification of gases containing $NO_x$ and/or hydrocarbons, as occur in the case of the above-mentioned internal combustion engines and also in incinerator power plants and the like, is not disclosed.

It is an object of the present invention to develop a catalyst that has good resistance to exhaust gases components, and also has a good purifying action, particularly for $NO_x$. Moreover, it is a further object of the present invention to develop a method for the production of such a catalyst.

Pursuant to the present invention, these and other objects are accomplished with a catalyst wherein at least one element selected from the group consisting of palladium, platinum, rhodium, ruthenium, osmium, iridium, rhenium, lanthanum, cerium, vanadium, titanium, niobium, molybdenum, tungsten, salts thereof and oxides thereof is added to a copper oxide/zinc oxide/aluminum oxide spinel having the chemical formula

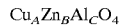

wherein $A+B+C \leq 3$ and $A>0$, $B>0$ and $C>0$.

Furthermore, these and other objects are also accomplished by providing a method for the production of such a catalyst comprising producing a spinel comprising copper, zinc and aluminum from copper oxide, zinc oxide and aluminum oxide, and incorporating in the spinel at least one element selected from the group consisting of palladium, platinum, rhodium, ruthenium, osmium, iridium, rhenium, lanthanum, cerium, vanadium, titanium, niobium, molybdenum, tungsten, salts thereof and oxides thereof.

As a result of the use of a $Cu_AZn_BAl_CO_4$ spinel as a catalyst, wherein $A+B+C \leq 3$, $A>0$, $B>0$, and $C>0$, wherein at least one of palladium, platinum, rhodium, ruthenium, osmium, iridium, rhenium, and/or rare earth, such as lanthanum and cerium, vanadium, titanium, niobium, molybdenum, tungsten and/or salts thereof and/or oxides thereof have been added, the catalyst is largely resistant to exhaust gas components such as $H_2O$, $NO_x$, $CO_2$ and/or $SO_2$; and the catalyst acts in an oxidizing manner on the hydrocarbons and in a catalytically reducing manner on the $NO_x$. The reduction of $NO_x$, takes place in an oxygen-containing gas and in the presence of reducing agents, such as hydrocarbons. Preferably, hydrocarbons are present in a sufficient concentration in the exhaust gases of the internal combustion engine. In preferred cases, reduction rates of more than 60% can be achieved at temperatures above 300° C.

According to the present invention, substoichiometric compounds in which $Al_2O_3$ functions as a matrix and which have characteristic spinel lines in the X-ray spectrum, are also regarded as spinels. In such substoichiometric compositions, a spinel of the composition $Al_2O_4$ is present in an $Al_2O_3$ matrix, so that an $A_{(1-x)}Al_2O_4$ stoichiometry results.

In a preferred embodiment, the catalyst is preferably a copper oxide/tin oxide/aluminum oxide spinel having the chemical formula

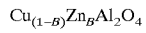

wherein $0<B<1$.

In another preferred embodiment, the catalyst is a copper oxide/tin oxide/aluminum oxide spinel having the chemical formula

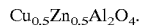

According to the present invention, the spinel is preferably used as a molded object or a split Villz billet, particularly a honeycomb.

According to the present invention, the spinel preferably comprises between 0.5% and 15% by weight cerium oxide, particularly between 1 and 8% by weight.

Other objects, advantages and novel features of the present invention will become apparent from the following detailed description of the invention when considered in conjunction with the accompanying drawings.

DETAILED DESCRIPTION OF THE PREFERRED EMBODIMENTS

EXAMPLE 1

A mixture which has a spinel structure and consists of 20% ZnO, 16% CuO and 64% $Al_2O_3$, hereinafter referred to as a $ZnCuAl_2O_4$ spinel, impregnated with 1.6% by weight of $CeO_2$, is used as the spinel. A 10 gram sample of the spinel having a particle size from 1.6 to 2 mm is transferred to a vertically oriented quartz reactor having a diameter of 20 mm and a height of approximately 500 mm, with a gas-permeable sintered glass disk disposed in the middle to expose the sample. The height of the bed was about 15 mm. A furnace was arranged around the quartz reactor which heated the middle part of the reactor over a length of about 100 mm at temperatures of up to 550° C.

A gas mixture, which consisted of 1,000 ppm NO, 1,000 ppm propene and 10% oxygen, with the remainder being argon as a carrier gas, was passed through the catalyst at sa space velocity of about 10000 per hour. After the gas mixture had passed through the reactor, the NO concentration was measured with a gas detector, in which any $NO_2$ formed was reduced in a converter to nitric oxide (NO) before the measurement. Oxidation of hydrocarbons to carbon dioxide was simultaneously observed by measuring the carbon dioxide content with the gas detector.

Figure 1:
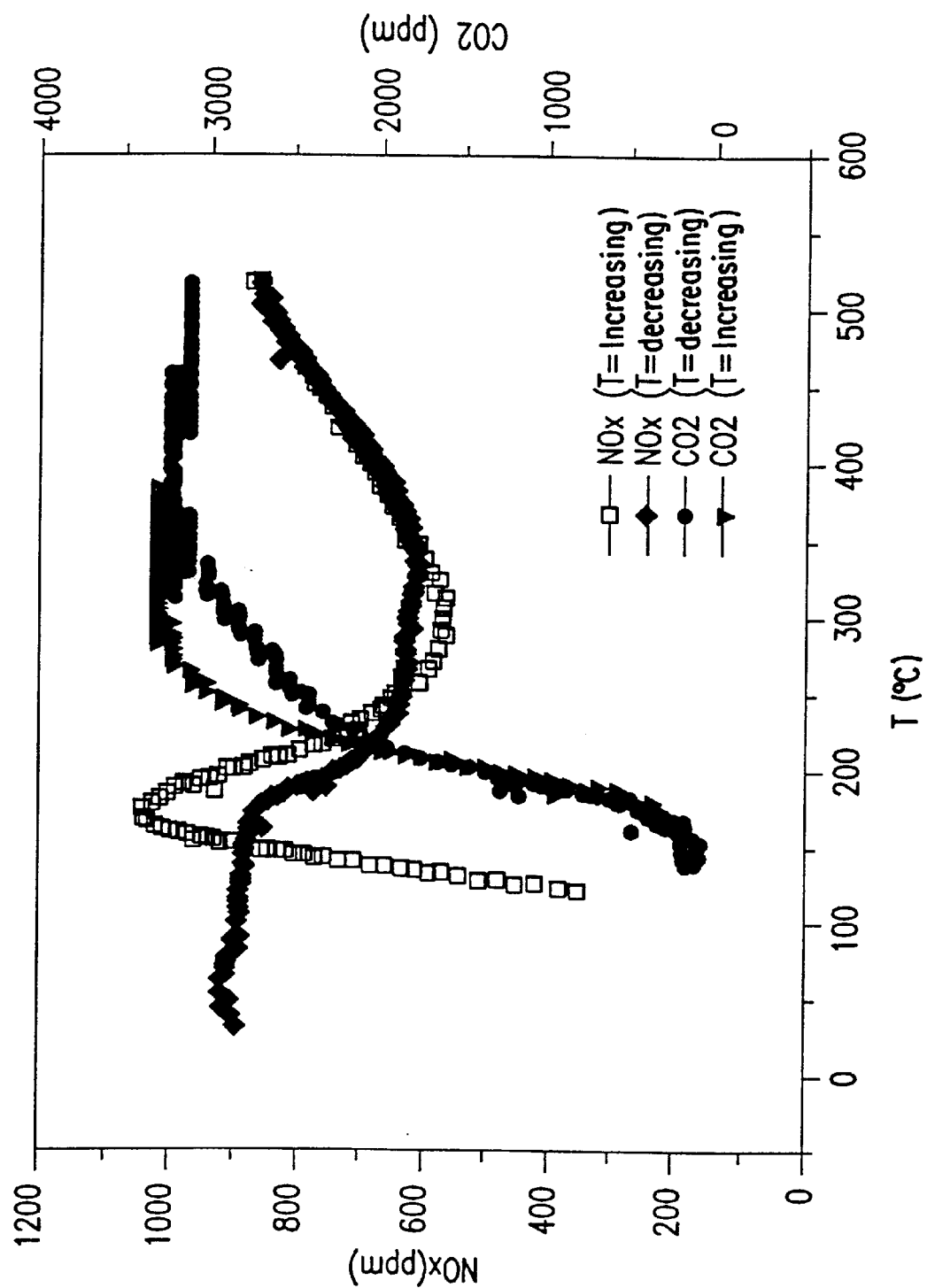
FIG. 1 is a graph of $NO_x$(NO) reduction and CO oxidation as a function of the temperature for a mixture which contains 20% ZnO, 16% CuO and 64% $Al_2O_3$, has a spinel structure and is impregnated with 1.6% by weight of $CeO_2$.

The result of the measurement with the $ZnCuAl_2O_4$ spinel of Example 1 is shown in the graph of FIG. 1. The $NO_x$(NO) and $CO_2$ concentrations are plotted in ppm as a function of the temperature, with the $NO_x$ concentration and the $CO_2$ concentration being marked differently. The graph shows a clear decrease in the $NO_x$(NO) concentration as the temperature increases. This concentration reaches a minimum at about 430° C. and subsequently rises once again. For the $ZnCuAl_2O_4$ spinel with 1.6% by weight of $CeO_2$, a drastic decrease in the $NO_x$ concentration is observed at a temperature above 150° C., and hydrocarbons are simultaneously decomposed to carbon dioxide, as indicated by the increase in the $CO_2$ concentration. The temperature range in which reduction of the $NO_x$ takes place lies between 150° C. and 50° C., depending on the composition of the material.

Preferably, the temperature intervals coincide with the temperatures which can occur in the exhaust gas system of an internal combustion engine.

Since this spinel has a good response behavior at relatively low temperatures, it is particularly suitable for use as a $NO_x$ exhaust gas catalyst for internal combustion engines and preferably, for diesel engines.

Further testing of this catalyst revealed a high resistance to $NO_x$, $H_2O$, and $CO_2$.

EXAMPLE 2

The above $ZnCuAl_2O_4$ spinel, additionally impregnated with 8% by weight of $CeO_2$, was used as the spinel. This spinel was prepared by impregnating a $ZnCuAl_2O_4$ spinel with 8% by weight of $CeO_2$.

A 10 gram sample of the spinel was transferred to a vertically oriented quartz reactor having a diameter of 20 mm and a height of approximately 500 mm, in which a gas-permeable sintered glass disk was disposed in the middle to expose the sample. The height of the bed was about 15 mm. A furnace was arranged about the quartz reactor which heated the middle part of the reactor over a length of about 100 mm at temperatures of up to 550° C.

A gas mixture comprising 1000 ppm NO, 1000 ppm propene and 10% oxygen, with the remainder being argon as a carrier gas, was passed through the catalyst at a space velocity of approximately 10000 per hour.

Figure 2:
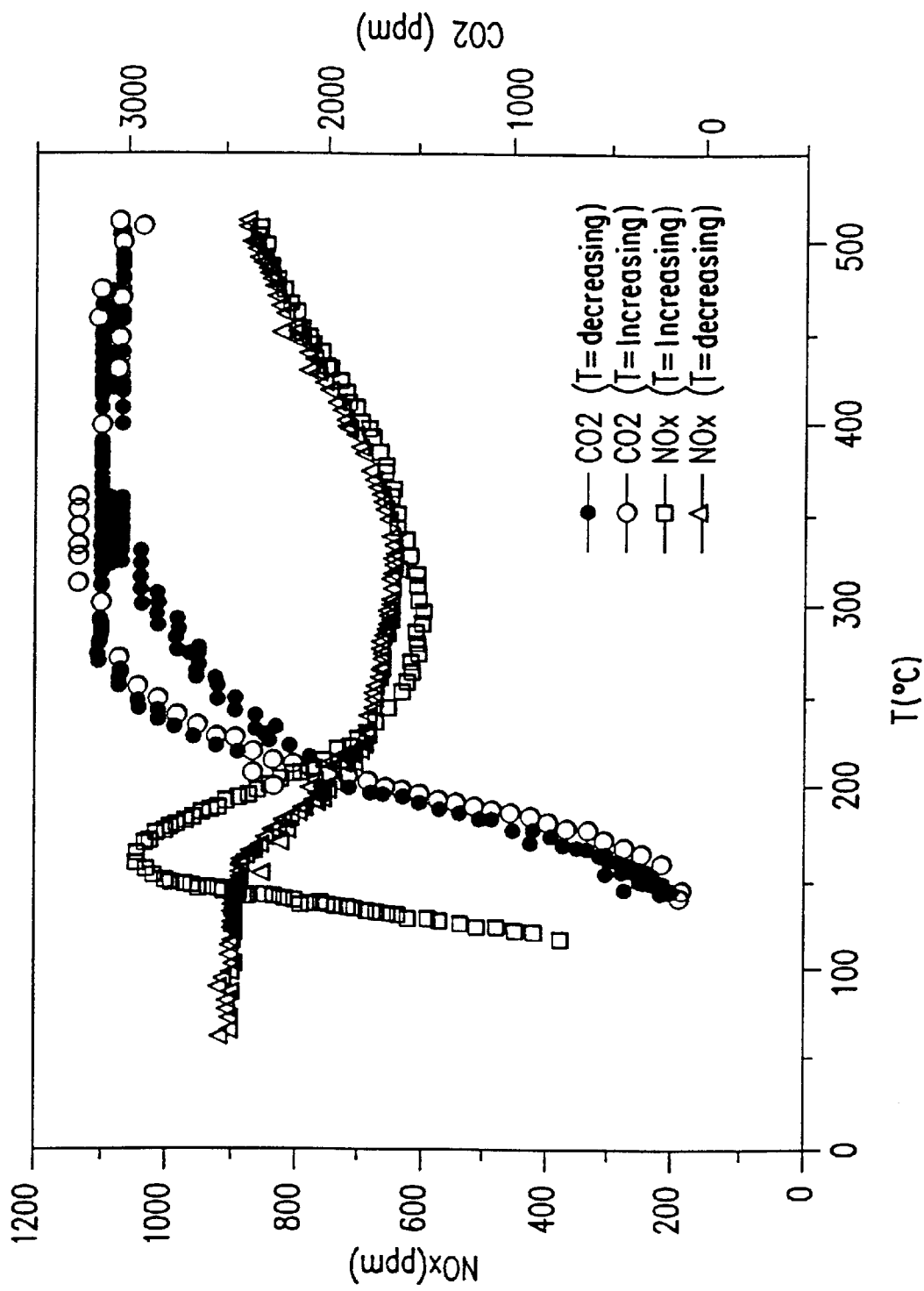
FIG. 2 is a graph of $NO_x$(NO) reduction and CO oxidation as a function of the temperature for a mixture which contains 20% ZnO, 16% CuO and 64% $Al_2O_3$, has a spinel structure and is impregnated with 86 by weight of $CeO_2$.

After the gas mixture had passed through the reactor, the NO concentration was measured with a gas detector, in which any $NO_2$ formed was reduced in a converter to nitric oxide (NO) before the measurement. Oxidation of hydrocarbons to carbon dioxide was simultaneously observed by measuring the carbon dioxide content with the gas detector. The result of the measurements with the $ZnCuAl_2O_4$ spinel of Example 2 is shown in the graph of FIG. 2. The $NO_x$(NO) and $CO_2$ concentrations are plotted in ppm as a function of the temperature, with the $NO_x$ concentration and the $CO_2$ concentration being marked differently.

In the graphs, a clear decrease can be noted in the $NO_x$(NO) concentration as the temperature increases. This concentration reaches a minimum at about 300° C. and subsequently rises once again.

For the $ZnCuAl_2O_4$ spinel with 8% by weight of $CeO_2$, a drastic decrease in the $NO_x$ concentration was observed at a temperature above 200° C., and hydrocarbons were simultaneously converted to carbon dioxide, as demonstrated by the increase in the $CO_2$ concentration. The temperature range in which reduction of the $NO_x$ took place lies between 200° C. and 500° C., depending on the composition of the material.

Advantageously, the aforementioned temperature interval coincides approximately with the temperatures which can occur in the exhaust gas system of an internal combustion engine.

Since the spinel of Example 2 has a good response behavior at relatively low temperatures, it is also particularly suitable for use as an $NO_x$ exhaust gas catalyst for internal combustion engines and, preferably, for diesel engines.

Further testing of this catalyst also revealed a high stability toward $NO_x$, $H_2O$, and $CO_2$.

EXAMPLE 3

The above-mentioned $ZnCuAl_2O_4$ spinel, mixed with oxides of tungsten, vanadium and titanium, was used as the spinel. The mixture contained up to 50% by weight of the $ZnCuAl_2O_4$ spinel, the remaining 50% by weight being formed of a mixture of 5% by weight $WO_3$, 36 by weight $V_2O$ and 42% by weight $TiO_2$. A 10 gram sample of the spinel was transferred to a vertically oriented quartz reactor having a diameter of 20 mm and a height of approximately 500 mm, in which a gas-permeable sintered glass disk was disposed in the middle to expose the sample. The height of the bed was about 15 mm. A furnace was arranged around the quartz reactor which heated the middle part of the reactor over a length of about 100 mm at temperatures of up to 550° C.

A gas mixture, comprising 1000 ppm NO, 1000 ppm propene and 10% oxygen, with the remainder being argon as a carrier gas, was passed through the catalyst at a space velocity of approximately 10000 per hour. After the gas mixture had passed through the reactor, the NO concentration was measured with a gas detector, in which any $NO_2$ formed was reduced in a converter to nitric oxide (NO) before the measurement. Oxidation of hydrocarbons to carbon dioxide was simultaneously observed by measuring the carbon dioxide content with the gas detector.

Figure 3:
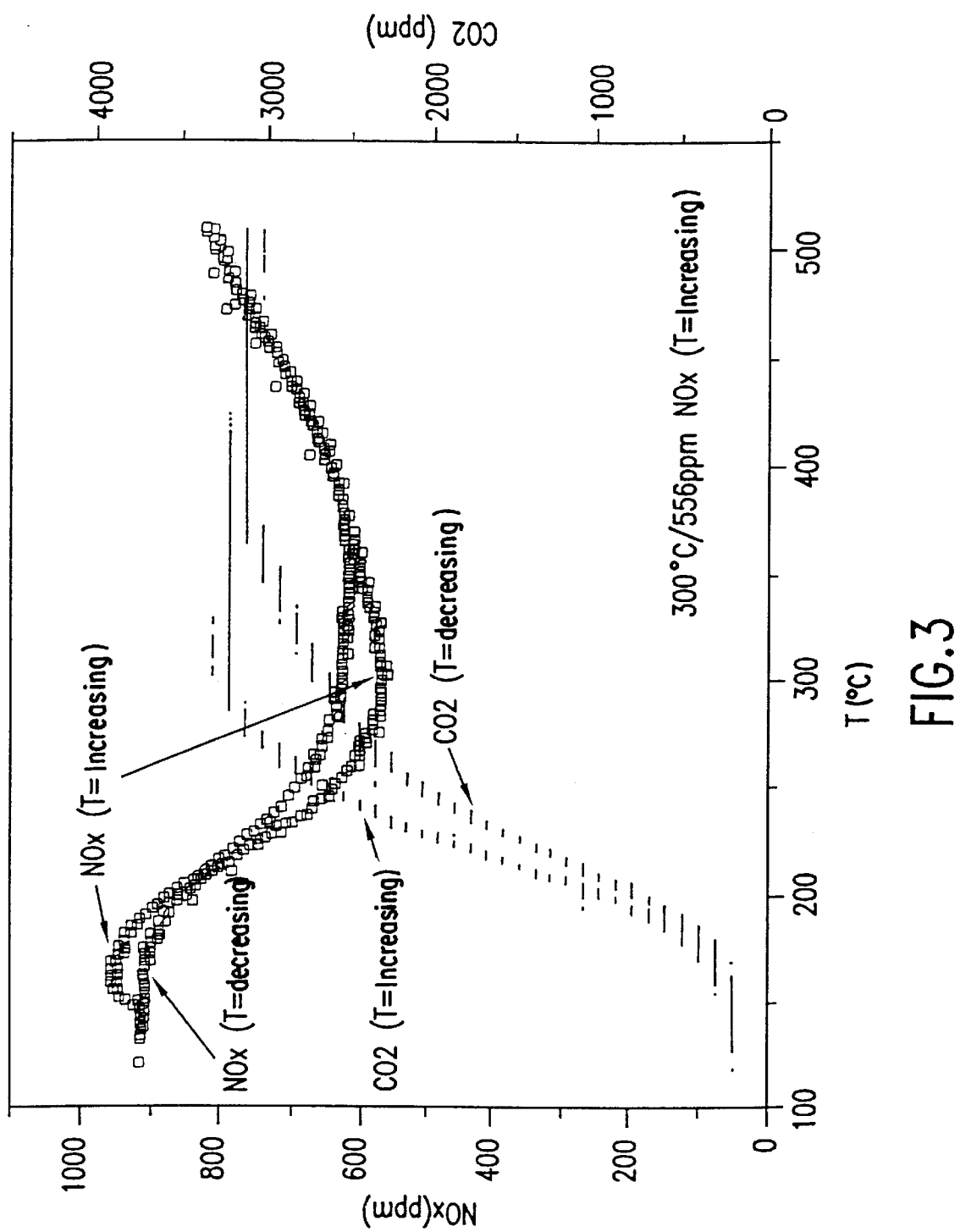
FIG. 3 is a graph of $NO_x$(NO) reduction and CO oxidation as a function of the temperature for a mixture which contains 20% ZnO, 16% CuO and 64% $Al_2O_3$, has a spinel structure and is additionally mixed with $WO_3$, $V_2O_5$ and $TiO_2$.

The result of the measurements with the spinel of Example 3 is shown in the graph of FIG. 3. The $NO_x$(NO) and $CO_2$ concentrations are plotted in ppm as a function of the temperature, with the $NO_x$ concentration and the $CO_2$ concentration being marked differently. In the diagram, a clear decrease in the $NO_x$(NO) concentration can be noted as the temperature increases. This concentration reaches a minimum at about 240° C. and subsequently rises once again. For the mixture, a drastic decrease in the $NO_x$ concentration is observed at a temperature above 150° C., and hydrocarbons are simultaneously decomposed to carbon dioxide as demonstrated by the increase in the $CO_2$ concentration. The temperature range in which reduction of the $NO_x$ takes place lies between 150° C. and 500° C. depending on the composition of the material.

EXAMPLE 4

The $ZnCuAl_2O_4$ mentioned above, impregnated with 0.1% of vanadium, was used as the spinel. A 10 gram sample of the spinel was transferred to a vertically oriented quartz reactor having a diameter of 20 mm and a height of approximately 500 mm, in which a gas-permeable sintered glass disk was disposed in the middle to expose the sample. The height of the bed was about 15 mm. A furnace was arranged about the quartz reactor which heated the middle part of the reactor over a length of about 100 mm at temperatures of up to 550° C.

A gas mixture comprising 1000 ppm NO, 1000 ppm propene and 10% oxygen, with the remainder being argon as a carrier gas, was passed through the catalyst at a space velocity of approximately 10000 per hour. After the gas mixture had passed through the reactor, the NO concentration was measured with a gas detector, in which any $NO_2$ formed was reduced in a converter to nitric oxide (NO) before the measurement. Oxidation of hydrocarbons to carbon dioxide was simultaneously observed by measuring the carbon dioxide content with the gas detector.

Figure 4:
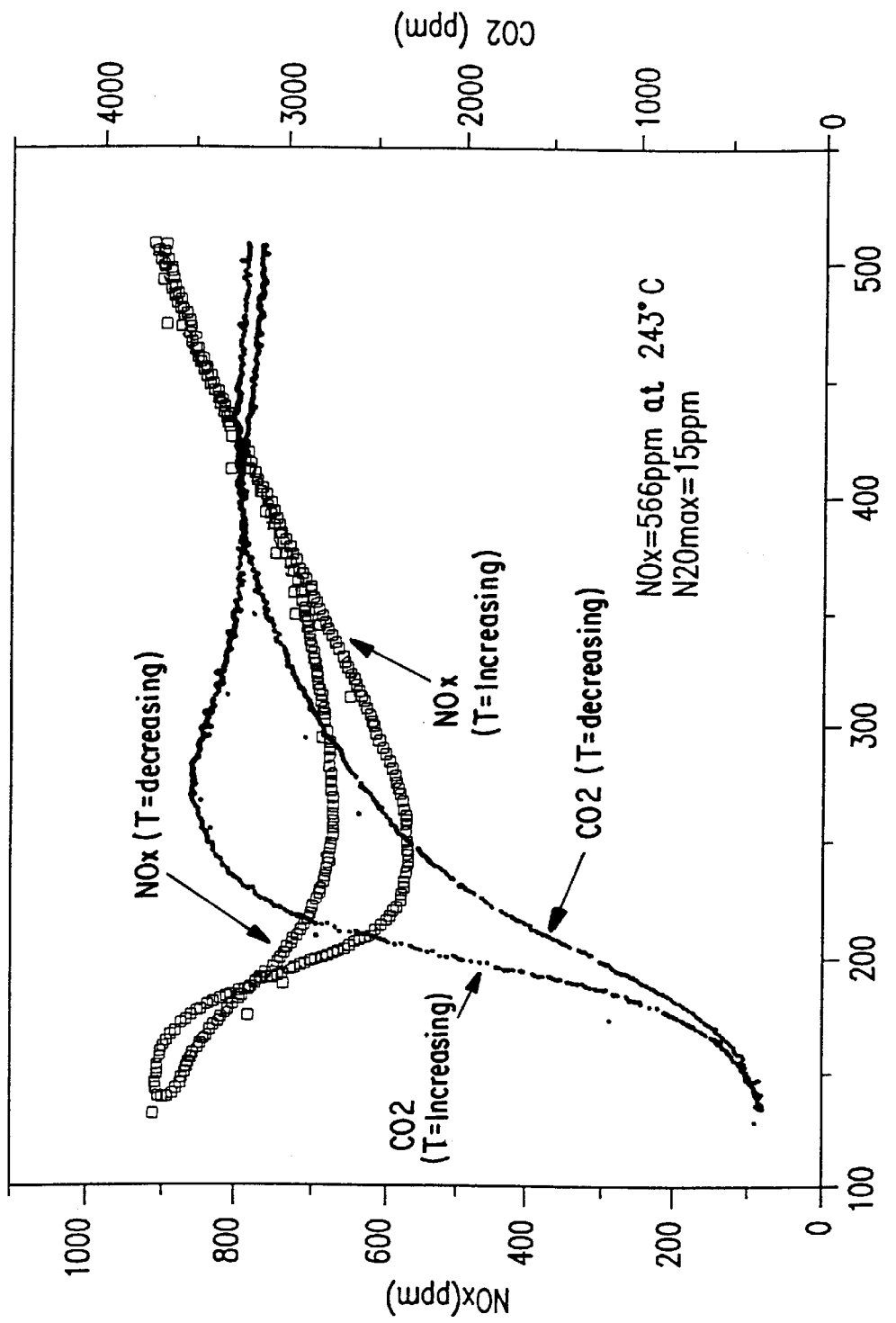
FIG. 4 is a graph of $NO_x$(NO) reduction and CO oxidation as a function of the temperature for a mixture which contains 20% ZnO, 16% CuO and 64% $Al_2O_3$, has a spinel structure and additionally contains 0.1% by weight of vanadium.

The result of the measurements with the spinel of Example 4 is shown in the graph of FIG. 4. The $NO_x$(NO) and $CO_2$ concentrations are plotted in ppm as a function of the temperature, the $NO_x$ concentration and the $CO_2$ concentration being marked differently. In the graph, a clear decrease in the $NO_x$(NO) concentration can be noted as the temperature increases. This concentration reaches a minimum at about 300° C. and subsequently rises once again. For the $ZnCuAl_2O_4$ spinel with vanadium, a drastic decrease in the $NO_x$ concentration was observed at temperatures above 170° C., and hydrocarbons were simultaneously decomposed to carbon dioxide as demonstrated by the increase in the $CO_2$ concentration. The temperature range in which reduction of the $NO_x$ took place lies between 170° C. and 500° C., depending on the composition of the material.

EXAMPLE 5

The above $ZnCuAl_2O_4$ spinel, impregnated with 0.5% of palladium, was used as the spinel. A 10 gram sample of the spinel was transferred to a vertically oriented quartz reactor having a diameter of 20 mm and a height of approximately 500 mm in which a gas-permeable sintered glass disk was disposed in the middle to expose the sample. The height of the bed was about 15 mm. A furnace was arranged around the quartz reactor which heated the middle part of the reactor over a length of about 100 mm at temperatures of up to 550° C.

A gas mixture comprising 1000 ppm NO, 1000 ppm propene and 10% oxygen, with the remainder being argon as a carrier gas, was passed through the catalyst at a space velocity of approximately 10000 per hour. After the gas mixture passed through the reactor, the NO concentration was measured with a gas detector, in which any $NO_2$ formed was reduced in a converter to nitric oxide (NO) before the measurement. Oxidation of hydrocarbons to carbon dioxide was simultaneously observed by measuring the carbon dioxide content with the gas detector.

Figure 5:
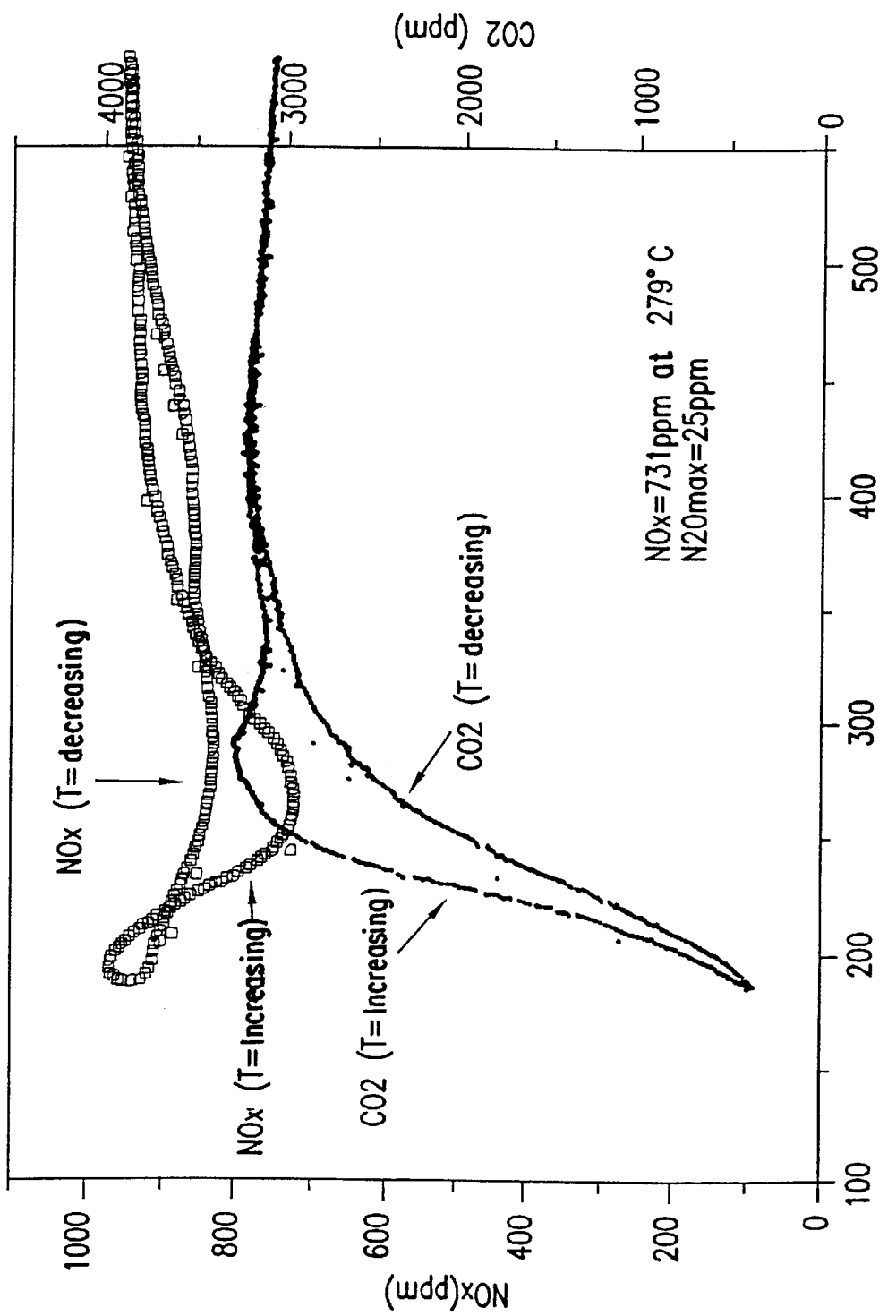
FIG. 5 is a graph of $NO_x$(NO) reduction and CO oxidation as a function of the temperature for a mixture which contains 20% ZnO, 16% CuO and 64% $Al_2O_3$, has a spinel structure and additionally contains 0.5% by weight of palladium.

The result of the measurements with the spinel of Example 5 are shown in the graph of FIG. 5. The $NO_x$(NO) and $CO_2$ concentrations are plotted in ppm as a function of the temperature, with the $NO_x$ concentration and the $CO_2$ concentration being marked differently. In the graph, a clear decrease in the $NO_x$(NO) concentration can be noted as the temperature increases. This concentration reaches a minimum at about 280° C. and subsequently rises once again. For the $ZnCuAl_2O_4$ spinel with 0.56 by weight of palladium, a drastic decrease in the $NO_x$ concentration was observed at a temperature above 180° C., and hydrocarbons simultaneously were decomposed to carbon dioxide as demonstrated by the increase in the $CO_2$ concentration. The temperature range in which reduction of $NO_x$ took place lies between 180° C. and 500° C., depending on the composition of the material.

Advantageously, this temperature interval coincides approximately with the temperatures which can occur in the exhaust gas system in an exhaust of an internal combustion engine.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of catalytically reducing nitrogen oxides ($NO_x$) in an exhaust gas comprising contacting the exhaust gas with a catalyst comprising a cooper oxide/zinc oxide/aluminum oxide spinel having the chemical formula

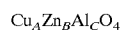

$Cu_AZn_BAl_CO_4$ wherein $A+B+C \leq 3$ and $A>0$, $B>0$ and $C>0$, having at least one element selected from the group consisting of palladium, platinum, rhodium, ruthenium, osmium, iridium, rhenium, lanthanum, cerium, vanadium, titanium, niobium, molybdenum, tungsten, salts thereof and oxides thereof incorporated therein in the presence of a reducing agent at a temperature between about 150° C. and 550° C.

2. A method according to claim 1, wherein said exhaust gas is exhaust gases of an internal combustion engine.

3. A method according to claim 2, wherein the internal combustion engine is a diesel engine.

4. A method according to claim 1, wherein the catalyst comprises a copper oxide/zinc oxide/aluminum oxide spinel having the chemical formula $$Cu_{(1-B)}Zn_BAl_2O_4$$

wherein 0<B<1.

5. A method according to claim 1, wherein the catalyst comprises a copper oxide/zinc oxide/aluminum oxide spinel having the chemical formula $$Cu_{0.5}Zn_{0.5}Al_2O_4.$$

6. A method according to claim 1, wherein the spinel has between 0.5% and 15% by weight cerium oxide incorporated therein.

7. A method according to claim 1, wherein the spinel has between 1 and 8% by weight cerium oxide incorporated therein.

8. A method of decreasing $NO_x$ from exhaust gas of an internal combustion engine, said method comprising the chemical formula $$Cu_AZn_BAl_CO_4$$

wherein A+B+C≦3 and A>0, B>0 and C>0;

adding to the spinel at least one element selected from the group consisting of palladium, platinum, rhodium, ruthenium, osmium, iridium, rhenium, lanthanum, cerium, vanadium, titanium, niobium, molybdenum, tungsten, salts thereof and oxides thereof, whereby a spinel-containing catalyst is formed; and catalytically reacting $NO_x$ by contacting the spinel-containing catalyst with an $NO_x$ containing exhaust gas from an internal combustion engine.

9. A method according to claim 8, wherein the catalyst comprises a copper oxide/zinc oxide/aluminum oxide spinel having the chemical formula wherein 0<B<1.

10. A method according to claim 8, wherein the catalyst comprises a copper oxide/zinc oxide/aluminum oxide spinel having the chemical formula $$Cu_{0.5}Zn_{0.5}Al_2O_4.$$

11. A method according to claim 8, wherein the spinel has between 0.5% and 15% by weight cerium oxide incorporated therein.

12. A method according to claim 8, wherein the spinel has between 1 and 8% by weight cerium oxide incorporated therein.

* * * * *